(12) United States Patent
Wurzburger

(10) Patent No.: US 6,962,662 B2
(45) Date of Patent: Nov. 8, 2005

(54) PROCESS FOR TREATING LIGHTLY CONTAMINATED ACID MINE WATER

(76) Inventor: Stephen Ray Wurzburger, P.O. Box C, Goodyear Bar, CA (US) 95944

(*) Notice: Subject to any disclaimer, the term of this patent is extended or adjusted under 35 U.S.C. 154(b) by 325 days.

(21) Appl. No.: 10/104,794

(22) Filed: Mar. 23, 2002

(65) Prior Publication Data

US 2002/0158023 A1 Oct. 31, 2002

Related U.S. Application Data

(63) Continuation-in-part of application No. 09/616,134, filed on Jul. 13, 2000, now abandoned.

(51) Int. Cl.$^7$ .................................................. C02F 1/66
(52) U.S. Cl. ...................... 210/709; 210/724; 210/746; 210/748; 210/806; 210/912
(58) Field of Search ............................... 210/709, 723, 210/724, 739, 746, 748, 806, 912

(56) References Cited

U.S. PATENT DOCUMENTS

| | | | | |
|---|---|---|---|---|
| 5,427,691 A | * | 6/1995 | Kuyucak et al. ............ 210/713 |
| 5,482,696 A | * | 1/1996 | Honigschmid-Grossich et al. ............ 423/552 |
| 5,698,107 A | * | 12/1997 | Wurzburger et al. ........ 210/695 |
| 6,110,379 A | * | 8/2000 | Overton et al. ............. 210/695 |
| 6,174,444 B1 | * | 1/2001 | Smit ............ 210/709 |

* cited by examiner

Primary Examiner—Betsey Morrison Hoey
(74) Attorney, Agent, or Firm—Robert Samuel Smith

(57) ABSTRACT

A process for removing metal sulfates from dilute aqueous solutions in which a conductivity control solution is injected into the stream. The solution is selected to increase the conductivity of the stream to a value wherein the ion state of each metal is then modified by passing the stream between electrodes of each pair of an array of pairs of electrodes. A voltage is imposed across each pair of electrodes, selected according to a target ion state for each of the various contaminants. The pH of the stream is then increased to a value where precipitate of metal hydroxide of the metal sulfates are formed. The precipitated metal hydroxide is then removed from the stream leaving a reduced amount of sulfate ions. A chemical is added to the stream in sufficient concentration to precipitate remaining sulfate ions from the waste stream which are removed by settling/filtering 9 Claims, 3 Drawing Sheets

PROCESS FOR TREATING LIGHTLY CONTAMINATED ACID MINE WATER

CROSS REFERENCE TO EARLIER FILED APPLICATIONS

This application is a continuation-in-part of application Ser. No. 09/616,134 filed Jul. 13, 2000 now abandoned from which priority is claimed.

FIELD OF THE INVENTION

This invention relates to water purification and particularly to a system for cleaning water from mining operations.

BACKGROUND AND INFORMATION DISCLOSURE

Mining activities in the western United States have created thousands of Acid Mine Drainage (AMD) generation sites. The contamination level of each site differs as to the number of metal contaminants and the acid content of the waste stream.

These contaminants are usually a mixture of heavy and light metals such as iron. copper zinc, magnesium, manganese, aluminum, cadmium, nickel and lead. The acid and sulfate levels vary greatly.

U.S. Pat. No. 5,698,107 to Wurzburger et al discloses a process that is capable of treating heavily contaminated acid mine water. The high metal ion content and acid levels of such waste streams are highly electrically conductive and therefore easily treated by this process.

Many AMD sites have light to moderate metal and acid loading and the AMD is not nearly as electrically conductive as the heavily contaminated waste streams.

The electrodes in the pretreatment reactors would have to be moved very close to each other in order to obtain sufficiently large current density necessary for the ion state modification disclosed in U.S. Pat. No. 5,698,107 to occur. The electrodes in close proximity to one another would greatly reduce the flow rate of these reactors and greatly reduce the treatment capacity of these systems.

There is also the problem of surface water intrusion into AMD waste streams during the winter months that reduces the conductivity of the waste stream by as much as 75% and increases the flow rate sometimes as much as 400%. Conventional AMD technologies use lime for pH control (neutralization) and provide calcium so as to precipitate the sulfates as a $CaSO_4$ salt. These processes have common weaknesses. They contaminate tons of $CaSO_4$ with a few pounds of hazardous waste metals making all the sludge a hazardous waste. Because the percentage of metal is so small, it is not economically feasible to try to recover the metals from these sludges.

The mine sites that are not amenable to hazardous waste storage have the added expense of placing the sludge in proper containers for hauling to a registered site, as well as requiring fees paid for sludge handling and storage. Sludge handling and storage costs are actually 300–400% of the actual water treatment costs. The use of complex thickeners to create a high density sludge can reduce sludge volumes but are capitol intensive and expensive to operate.

Previous methods of treating mine water all have limitations on their effectiveness or create such large amounts of metal contaminated sludge. These liming systems can not meet the new more stringent standards for water discharge.

U.S. Pat. No. 3,823,081 shows the use of electrolytic cells to create free hydroxide to precipitate the metals. These metals have to be oxidized with ozone or in ponds before treatment. Both treatments are very expensive and do not address removal of the remaining sulfate ions $(SO_4)^{-2}$ that are just a hazardous as the metal ions to plant and animal life.

U.S. Pat. No. 5,427,691 is a greatly improved version of a conventional lime treatment system and does address a means for oxidizing some of the iron and other metals. The process has the same limitations as all the other lime treatments in their inability to remove low valence metals ($Cu^+$) or the very high valence metals such as hexavalent chrome or manganese ($Cr^{6+}$, $Mn^{6+}$) The greatest weakness of all these lime processes is that huge amounts of calcium sulfate precipitates are created along with the metals, converting the sulfates into a hazardous waste instead of keeping them separated so as to provide economic benefits.

SUMMARY

It is an object of this invention to remove light and heavy metal ions from a waste stream having a very low concentration of the metals. In particular, it is an object to treat a waste stream having an electrical conductivity corresponding to less than 1500 u.s.

This invention is directed toward a process in which a conductivity control solution is injected into the stream. The solution is selected to increase the conductivity of the stream to a value wherein the ion state of each metal is then modified by passing the stream between electrodes of each pair of an array of pairs of electrodes. A voltage is imposed across each pair of electrodes, selected according to a target ion state for each of the various contaminats. The pH of the stream is then increased to a value where the metals are precipitated as insoluble metal hydroxide of the metal sulfates are formed. The precipitated metal hydroxide is then removed from the stream leaving a metal free sulfate solution. A chemical is added to the stream in sufficient concentration to precipitate most of the remaining sulfate ions from the waste stream which are removed by settling/filtering

DESCRIPTION OF A PRREFERRED EMBODIMENT

Figure 1:
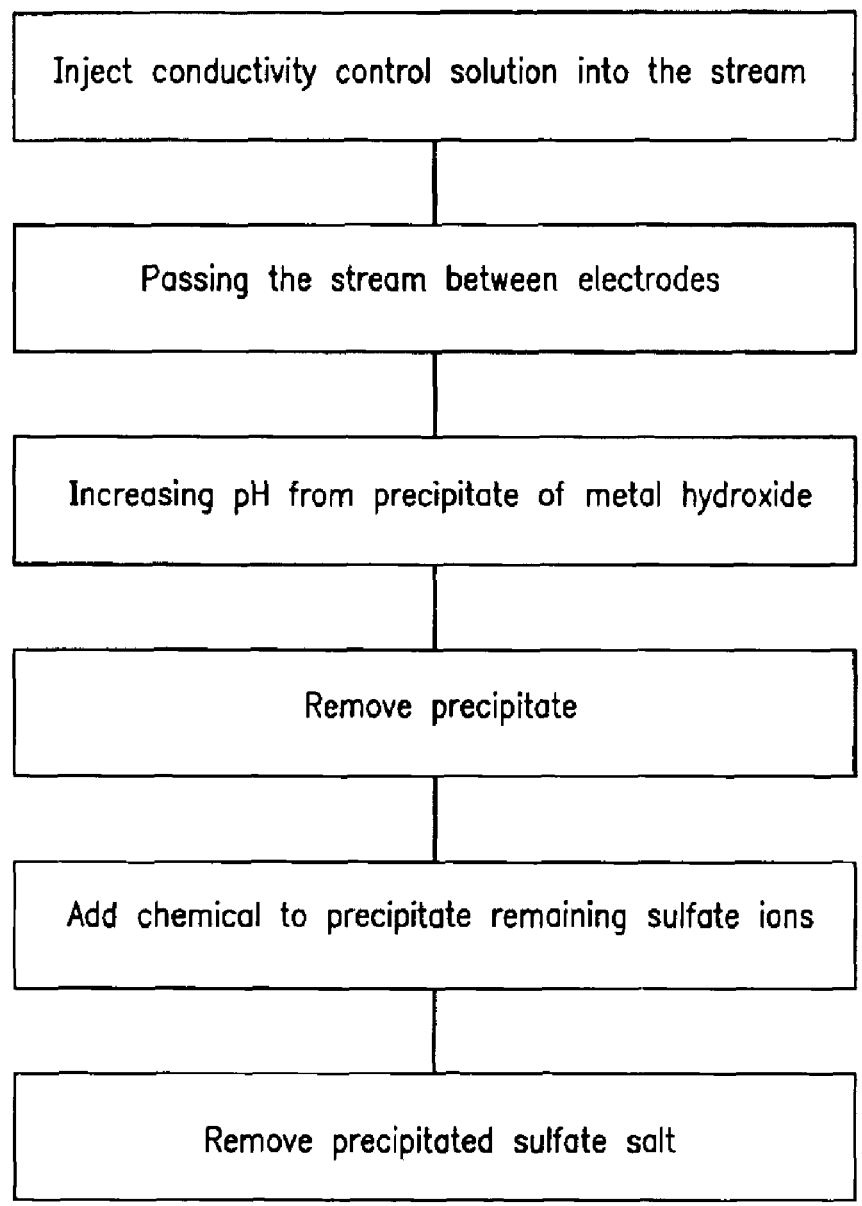
FIG. 1 is a flow chart illustrating general principles of the invention.

Turning now to a discussion of the drawings, FIG. 1 is a flow chart showing the steps in a method for removing small concentrations of metal sulfate contaminants from a stream of water in accordance with the invention:

In step 1, a conductivity control solution is injected into the stream wherein the solution is selected to increase and maintain the conductivity of the stream to a value wherein the ion state of each metal can be modified by passing the stream between electrodes of each pair of an array of pairs of electrodes, each electrode having a selected voltage with respect to the other member of the pair of electrodes.

In step 2, the stream is passed between electrodes of each pair of an array of pairs of electrodes, each electrode having a selected voltage with respect to the other member of the pair of electrodes;

In step 3, the pH of the stream is increased to a value where precipitation of insoluble metal hydroxides of the metal sulfates are found in the stream.

In step 4, the metal hydroxide is removed from the stream leaving a reduced concentration of sulfate ions in the stream;

In step 5, a precipitating chemical is added to the stream in sufficient concentration to precipitate most of the remaining sulfate ions from the stream;

In step 6, remaining precipitated sulfate salt is removed from the stream.

Figure 2:
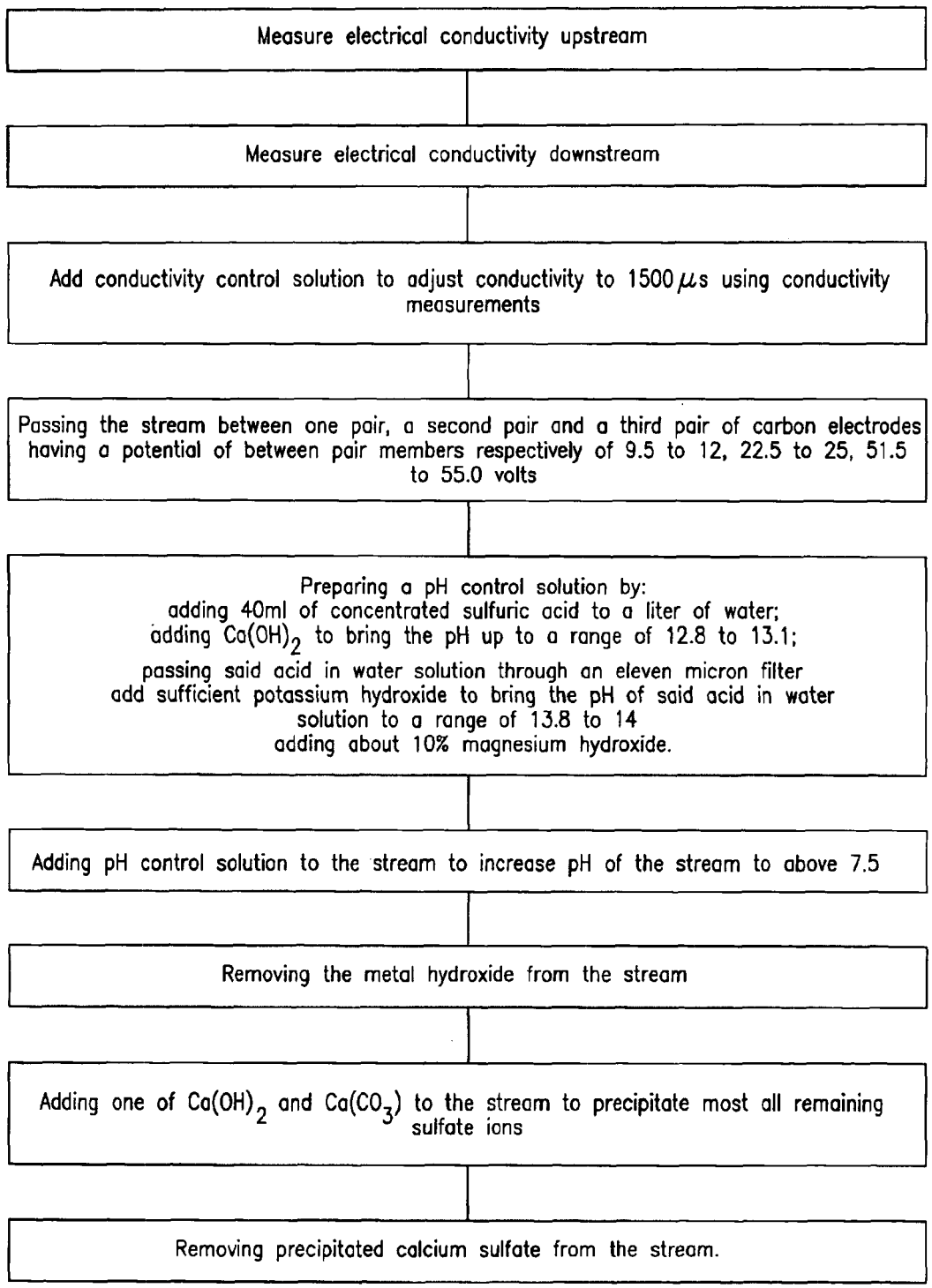
FIG. 2 is a flow chart showing the steps in FIG. 1 in greater detail.

Further details of each step are presented in the flow chart of FIG. 2 and discussed in connection with FIG. 3.

Figure 3:
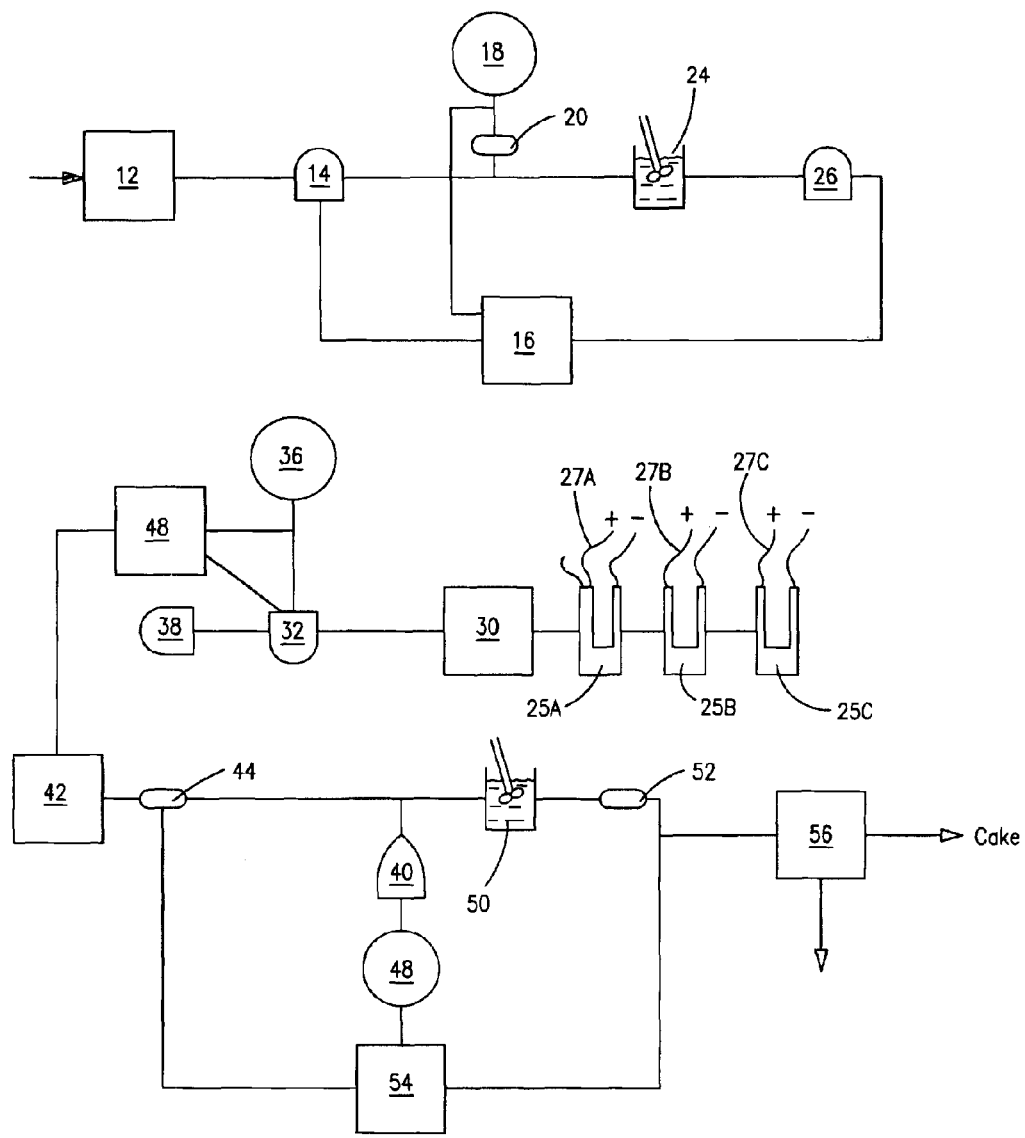
FIG. 3 is a schematic representation of the apparatus for performing the method of the invention.

FIG. 3 is a diagram of the apparatus for practicing the method of this invention. There are shown:

an influent surge tank 12;

a conductivity sensor 14 which measures conductivity of the stream as the stream leaves the surge tank 12; (step 1A).

a chemical injector 20 connected to inject chemical A from reservoir 18 into the stream (step 1B);

a mixer 24 which mixes chemical A and the stream (step 1C);

a conductivity sensor 26 which measures conductivity of the stream after mixing chemical A into the stream (step 1D);

a controller 16 responsive to conductivity sensors 14 and 26 that controls addition of chemical A from reservoir 18 to the stream (step 1E);

an array of series connected reactors, each reactor being a tank 25A, B, C each holding a pair of electrodes 27 A, B, C (preferably carbon) through which the stream passes. Voltage across each pair of electrodes is selected according to the valence transition required for each species of contaminant (step 2).

a pH sensor 30 for measuring pH of the stream emerging from the array of reactors (step 3A);

a chemical injector 32 for injecting a second chemical, "B", into the stream from reservoir 36 (step 3B);

a pH sensor 38 for measuring pH of the stream emerging from the ejector 32 (step 3C);

pH control monitors 40 responsive to pH signals from pH sensors 30 and 38 for controlling the flow of chemical "B" from reservoir 36 into the stream. (step 3D.)

a clarifier 42 being at least one of a settling tank and filtering system (well known in the art) through which the stream passes and which strips precipitated heavy metal contaminants out of the stream leaving a solution of $SO_4^-$ ions (step 4)

a pH sensor 44 which measures the pH of the stream flowing out of the clarifier 42 (step 5A)

a chemical injector 46 for injecting a chemical "C" into the stream from reservoir 48 which is mixed by mixer 50 (step 5B);

a pH sensor 52 which measures the pH of the stream flowing out of the mixer 50 (step 5C)

pH controllers 54 responsive to pH sensors 44 and 52 which control flow of chemical C. Chemical C is preferably calcium hydroxide added at a small rate to tie up any remaining sulfate (step 5D);

clarifier 56 being at least one of a settling tank and filter for removing the remaining sulfate from solution as precipitated calcium sulfate (step 6).

According to a preferred embodiment of the invention, a concentrated mixture of magnesium sulfate and ferric sulfate is dissolved in water to form a "conductivity control solution" (CCS) The composition of CCS is preferably equal parts of magnesium sulfate and ferric sulfate. The CCS is injected into the stream so as to raise the electrical conductivity of the AMD (acid mine discharge) to an optimum value which is effective in modifying the ion state of the polluting metals. Modification of the ion state of the polluting metal is effected by passing the stream between electrodes preferably carbon, across which an electric field is applied. The voltage between the electrodes in each chamber is selected to optimize the "conditioning" of a particular class of ionic species, (e.g., single valence, double valence, triple valence).

In a preferred arrangement, carbon electrodes 27A, B, C are spaced up to 1.5 inches apart. In one embodiment a voltage of 9.5 to 12 volts is impressed across the electrodes of the first I.S.M. station, a voltage of 22.5 to 25 volts is impressed across the electrodes of the second I.S.M. station 14, a voltage of 51.5 to 55 volts is impressed across the electrodes of the third I.S.M. station 16.

The conductivity of the solution is monitored and controlled by Signet Conductivity Control Systems. A small amount of the C.C.S. is injected into the waste stream to increase and maintain the conductivity to 1500 u.s. The stream with modified conductivity is passed through the array of electrolytic reactors (each reactor being a pair of carbon electrodes in a reservoir) where the ion states of the various contaminating metals are modified as discussed.

The electrolytically treated solution flows through a pH controlled chemical injection system and into a second chemical mixer where the pH control chemical is added. The pH of the system is monitored and controlled by a signet pH control system The pH is raised to at least 7.5. The preferred solution added to increase the pH is prepared as follows:

adding 40 ml of concentrated sulfuric acid to each one liter of water.

adding $Ca(OH)_2$ to bring the pH of said acid in water solution up to a range of 12.8 to 13.1;

passing said acid in water solution the solution through an eleven micron filter thereby removing any particulates of Ca $SO_4$ larger than 11 microns.

adding sufficient mix of potassium and magnesium hydroxide to bring the pH of said acid in water solution to a range of 13.8 to 14 thereby producing a base solution (the mix is about 90% K and 10 Mg)

When this solution is added in sufficient amount to raise the pH to above 7.5, all of the metals will form insoluble metal hydroxides. The addition of anionic polymers aids the precipitation of the metal hydroxides. The waste stream is pumped into a clarifier (thickener) to allow the hydroxides to separate from the water. The remaining stream is now virtually metal free but still contains high levels of $SO_4^{2-}$.

The demetallized sulfate water is pumped through a second signal control's automatic control unit where a small amount of $Ca(OH)_2$ is injected through a third chemical mixer the slurry is pumped into a second clarifier (thixckener) where the $CaSO_4$ is permitted to precipitate thereby removing most of the $SO_4^{2-}$. The Ca $SO_4$ has some value as a soil amendment and is at least sufficiently pure to legally permit storing the compound on site.

With most lightly and moderately contaminated AMD waste streams, the metal sludge created is only 6–10% of the sludge volume. Therefore the volume of hazardous sludge that has to be shipped is reduced by 94–90%.

EXAMPLE 1

Water samples are taken from a northern California abandoned copper mine site that is discharging 35 gallons per minute of water into a drinking water supply, the AMD from this site produced the following metals at a pH equal to 3.0

|  | Untreated (parts per billion) | treated parts per billion |
|---|---|---|
| Aluminum | 5800 | 223 |
| Cadmium | 110 | not detectable < 5 |
| Copper | 5100 | 87.8 |
| Lead | 41 | not detectable < 5 |
| Manganese | 4400 | 124 |
| Zinc | 26,000 | 162 |
| Sulfate | 1600 (parts per million) | |

The total metal concentration was reduced from 41,451 parts per billion to 286 parts per billion, a 99.9931% reduction.

During this two week treatment study, there were several days of rain which increased the flow rate from the mine, reduced the metal content of the stream and conductivity and raised the pH.

The Signet Conductivity Control system added conductivity control solution (CCS) to the A.M.D. to maintain required conductivity.

The diluted stream was tested and there was found to have been 47% reduction in the ionic content of the AMD. The automatic controls in the pilot plant compensated for the changes in the treated AMD without a problem. The treated AMD had a metal content was reduced to well below discharge specifications—actually to well below drinking water standards.

AMD AT PH 3.8 WITH SURFACE WATER CONTAMINATION

|  | Untreated (parts per billion) | treated parts per billion |
|---|---|---|
| Aluminum | 4000 | 100 |
| Cadmium | 80 | not detectable < 10 |
| Copper | 3700 | not detectable < 50 |
| Lead | 180 | not detectable < 50 |
| Manganese | 380 | not detectable < 10 |
| Zinc | 14000 | 90 |

The total metal loading was reduced from 2 2,340 parts per billion to 280 parts per billion (readable) a 99.915% reduction.

Over a 12 day period, the system treated approximately 163,000 gallons of mixed AMD. During this test, less than 150 gallons of metal hydroxide cake was produced. This converts to less than 1 gallon of sludge per 1000 gallons of AMD treated. The metal content of this sludge is near 35%, when the sludge has been dried and has commercial value.

EXAMPLE 2

Water samples were taken from a Northern California gold mine and mill site that has an AMD discharge ranging from 35 gallons per minute in the summer and fall to 400 gallons per minute during the winter months. This mine has both an underground and open pit working and a substantial amount of mill tailings is impounded behind a large tailing dam. Their combined flows were treated by the process of this invention.

AMD AT A PH OF 3.4 COMBINATION OF SOURCES

|  | Untreated (parts per billion) | Treated (parts per billion) |
|---|---|---|
| Copper | 135,000 | not detected < 2 |
| Iron | 331,000 | not detected < 50 |
| Manganese | 20,100 | not detected < 1 |
| Zinc | 42,900 | not detected < 20 |
| Cyanide-Total | 59 | not detected < 10 |
| Cyanide-WAG | 11 | not detected < 10 |

The total metal load was reduced from 1,015,100 parts per billion to 0 parts per billion (readable) almost a full 100% reduction.

The lab test of this AMD site showed that this system reduces the volume of sludge to be removed from this site by 60%. The process not only destroyed the soluble cycanides, it also reduced the total cyanides to below the detection limits of 10 parts per billion during the metal removal process.

The process of this invention has wide application in the many hazardous chemical sites where acid mine drainage (AMD) as well as other sites where generation of water polluted with heavy metals and sulfates are a serious problem. The general practice of the invention is to increase the conductivity of streams polluted with low level amounts of light and heavy metal ions to a value where the ion state of the metals can be modified by electrolyzing the stream. In this condition, the metals can be removed by raising the pH to a value where precipitation followed by clarification or filtration can take place. Another feature of the invention is the novel use of a pure base aqueous solution to raise the pH thereby reducing the volume of metal cake. The sulfates can now be reduced by the addition of $Ca(OH)_2$ the solution particles can be removed by precipitation or filtration in the later steps of the process.

Variations and modifications of this invention of this invention may be contemplated after reading the specification which are within the scope of the invention.

For example, other metal hydroxides may be substituted, e.g. Barium, in place of the Calcium may be used as an additive in the precipitation steps.

Calcium carbonates may be used instead of Calcium Hydroxide in some cases where the residual carbonates may be beneficial to aquatic life.

Techniques other than adding pure base solution may be used to raise the pH such as electrolyzing the water techniques with inert anodes.

Other well known methods of removing precipitates could be employed other than settling and filtration.

The measurement of pH may be measured with a single sensor reading the pH of the stream in the mixing tank 39 directly.

The measurement of conductivity may be measured with a single sensor reading the conductivity of the stream in the mixing tank 24 directly.

It is therefore desired that the scope of the invention be defined by the appended claims.

What is claimed is:

1. A method for removing small concentrations of metal sulfate contaminants from a stream of water including the steps, in operable order:
   (a) injecting a conductivity control solution into the stream wherein said solution is selected to increase the conductivity of the stream to a value wherein in a following step(b), the ion state of each metal is modified by passing the stream between electrodes of each pair of an array of pairs of electrodes, each electrode having a selected voltage with respect to the other member of the pair of electrodes;

(b) passing the stream between electrodes of each pair of an array of pairs of electrodes, each electrode having a selected voltage with respect to the other member of the pair of electrodes;

(c) increasing a value of pH of the stream to a value where precipitate of the metal sulfates are formed in said stream;

(d) removing the precipitate from said stream whereby a reduced amount of sulfate ions remains in said stream;

(e) adding a precipitating chemical to the stream in sufficient concentration to precipitate most of the remaining sulfate ions from said stream;

(f) removing precipitated sulfate salt from said stream.

2. The method of claim 1 wherein step (a) includes the steps:

(a.i) obtaining a first measurement of the conductivity of the stream upstream from where the conductivity control solution is added and a second measurement of the conductivity downstream from where the conductivity control solution is added providing an upstream conductivity measurement and a downstream conductivity measurement;

(a.ii) applying said first and second measurements of conductivity to a controller to control conductivity of said stream by controlling addition of conductivity control solution to the stream whereby consistent conductivity is maintained.

3. The method of claim 1 wherein said step (a) includes the step of preparing said conductivity control solution by adding at least one of iron and magnesium sulfate to water in sufficient quantity that when said conductivity control solution is added to the stream, conductivity of the stream is increased to at least 1500 u.s.

4. The method of claim 1 wherein said step (b) includes the steps:

passing the stream between three pairs of carbon electrodes, each electrode of each pair spaced at a distance selected from a range of distances up to about 1.5 inches from said other electrode;

impressing a voltage of 9.5 to 12 volts across the electrodes of a first pair of said three pairs, a voltage of 22.5 to 25 volts across the electrodes of a second pair of said three pairs a voltage of 51.5 to 55 volts across said third pair of of said three pairs.

5. The method of claim 1 wherein said step (c) includes the step of preparing a solution for raising pH of the stream by the steps:

adding 40 ml of concentrated sulfuric acid to each one liter of water, adding $Ca(OH)_2$ to bring the pH of said acid in water solution up to a range of 12.8 to 13.1;

passing said acid in water solution through an eleven micron filter thereby removing any particulates of Ca $SO_4$ larger than eleven microns;

adding about 90% potassium hydroxide and 10% magnesium hydroxide to bring the pH of said acid in water to a range between 13.8 and 14 thereby producing a base solution.

6. The method of claim 1 wherein said step (c) includes the step of raising the pH to a value greater than 7.5.

7. The method of claim 1 wherein said step (d) includes the step of removing said precipitate by at least one of admitting said stream into a settling tank and passing said stream through a filtering device.

8. The method of claim 1 wherein said step (e) includes the step adding $Ca(OH)_2$ to the stream in sufficient concentration to precipitate remaining sulfate ions from said stream.

9. A method for removing small concentrations of metal ion contaminants from a stream of water including the steps, in operable order:

(a) obtaining a first measurement of electrical conductivity of the stream upstream from where an aqueous solution of at least one of iron and magnesium sulfate is added and a second measurement of electrical conductivity downstream from where said aqueous solution is added;

(b) applying said first and second measurements of conductivity to a controller to control addition of said aqueous solution to the stream wherein said value of conductivity is at least 1500 u.s;

(c) passing the stream between three pairs of carbon electrodes wherein each electrode of each pair is spaced at a distance selected from a range of distances up to about 1.5 inches from said other electrode, and applying a voltage of 9.5 to 12.0 volts across the electrodes of a first pair of said three pairs, a voltage of 22.5 to 25 .0 volts across the electrodes of a second pair of said three pairs, a voltage of 51.5 to 55 .0 volts across said third pair of of said three pairs;

(d) preparing a pH control solution by the steps:

adding 40 ml of concentrated sulfuric acid to each one liter of water;

adding $Ca(OH)_2$ to bring the pH of said acid in water solution up to a range of 12.8 to 13.1;

passing said acid in water solution the through an eleven micron filter thereby removing any particulates of Ca $SO_4$ larger than eleven microns;

adding a mix of about 90% potassium hydroxide and 10% magnesium hydroxide to bring the pH of said acid in water to a range between 13.8 and 14 thereby producing a base solution;

(e) adding said pH control solution to the stream to increase pH of the stream to above 7.5 providing that precipitation of insoluble metal hydroxide of metal ions are formed in said stream;

(f) removing the metal hydroxide from the stream whereby a metal free sulfate ions remains in the stream;

(g) adding one of calcium hydroxide and calcium carbonate to the stream in sufficient concentration to precipitate substantially remaining sulfate ions from said stream;

(h) removing the precipitated calcium sulfate from the stream.

* * * * *